(12) United States Patent
Marable

(10) Patent No.: US 12,203,284 B1
(45) Date of Patent: Jan. 21, 2025

(54) PORTABLE SUN CANOPY

(71) Applicant: Robert Marable, Gastonia, NC (US)

(72) Inventor: Robert Marable, Gastonia, NC (US)

( * ) Notice: Subject to any disclaimer, the term of this patent is extended or adjusted under 35 U.S.C. 154(b) by 27 days.

(21) Appl. No.: 17/729,079

(22) Filed: Apr. 26, 2022

(51) Int. Cl.
*E04H 15/02* (2006.01)
*A45B 23/00* (2006.01)
*B62B 1/26* (2006.01)
*B62B 5/00* (2006.01)
*E04H 15/44* (2006.01)
*E04H 15/58* (2006.01)

(52) U.S. Cl.
CPC ............ *E04H 15/44* (2013.01); *A45B 23/00* (2013.01); *B62B 1/262* (2013.01); *B62B 5/0013* (2013.01); *E04H 15/02* (2013.01); *E04H 15/58* (2013.01); *A45B 2023/0093* (2013.01); *B62B 2202/52* (2013.01); *Y10S 135/904* (2013.01)

(58) Field of Classification Search
CPC ........... E04H 15/02; E04H 15/58; B62B 1/12; B62B 1/20; B62B 5/0013; B62B 2200/52; A45B 2200/1045; Y10S 135/904
USPC .......... 135/114, 115, 901, 902, 904, 912, 96, 135/120.1
See application file for complete search history.

(56) References Cited

U.S. PATENT DOCUMENTS

| | | | | |
|---|---|---|---|---|
| 2,518,167 A * | 8/1950 | Mintz | ...................... | E04H 15/48 135/147 |
| 2,521,768 A * | 9/1950 | Adams | ................... | A45B 23/00 135/121 |
| 2,554,688 A * | 5/1951 | Vollweiler | ................ | A45F 4/04 383/4 |
| 2,777,454 A * | 1/1957 | Kramer | ................. | E04H 15/003 D21/837 |
| 2,825,352 A | 3/1958 | Lemen | | |
| 2,865,386 A * | 12/1958 | Burns | ..................... | E04H 15/64 D21/834 |
| 2,888,021 A * | 5/1959 | Adams | ................... | A45B 23/00 135/90 |
| 2,928,405 A * | 3/1960 | Lawson | ................ | E04H 15/003 D25/56 |
| 3,044,476 A * | 7/1962 | Avery | ..................... | E04H 15/64 D21/834 |
| 3,052,249 A * | 9/1962 | Seaman | .................. | E04H 15/00 135/117 |
| 3,162,920 A * | 12/1964 | Durham | ................. | A01F 25/13 24/265 R |
| 3,581,436 A * | 6/1971 | Basiger | ............. | A01G 13/0206 160/24 |
| 3,590,864 A * | 7/1971 | Vechesloff | ............... | A45F 4/02 135/96 |

(Continued)

*Primary Examiner* — Robert Canfield

(74) *Attorney, Agent, or Firm* — Kyle A. Fletcher, Esq.

(57) ABSTRACT

The portable sun canopy is a temporary structure. The portable sun canopy forms a protected space. The portable sun canopy is a collapsible structure. The portable sun canopy is a portable structure. The portable sun canopy forms a protected space when the portable sun canopy is deployed. The portable sun canopy is anchored into the ground. The portable sun canopy comprises a pedestal structure, a tarpaulin, and a storage cart. The pedestal structure elevates the tarpaulin above the ground. The tarpaulin forms a barrier that creates the protected space. The storage cart stores the portable sun canopy for transport after the portable sun canopy is collapsed.

16 Claims, 4 Drawing Sheets

(56) References Cited

U.S. PATENT DOCUMENTS

| | | | |
|---|---|---|---|
| 3,606,445 A * | 9/1971 | Wunderlich | B60P 3/36 296/168 |
| 4,641,676 A | 2/1987 | Lynch | |
| 4,750,508 A * | 6/1988 | Tatoian | E04H 15/003 135/118 |
| 4,873,841 A * | 10/1989 | Bradshaw | A45C 5/14 62/239 |
| 5,143,108 A * | 9/1992 | Kenney | A45B 23/00 108/151 |
| D333,875 S | 3/1993 | Jones | |
| 5,269,157 A * | 12/1993 | Ciminelli | A45B 11/00 297/188.1 |
| 5,415,194 A * | 5/1995 | Kaye | E04H 15/58 135/900 |
| 5,464,237 A * | 11/1995 | Saporiti | B62B 1/20 280/30 |
| 5,480,170 A * | 1/1996 | Kaiser | A47B 31/02 280/30 |
| 5,622,197 A * | 4/1997 | Valaire | E04H 15/58 114/106 |
| 5,669,655 A * | 9/1997 | Hammond | B60P 3/341 296/165 |
| 5,692,534 A * | 12/1997 | Brumfield | E04H 15/322 135/117 |
| 5,810,334 A * | 9/1998 | Menaker | E04H 15/003 135/900 |
| 5,927,311 A * | 7/1999 | Jager | E04H 15/003 135/124 |
| 5,957,145 A * | 9/1999 | Plumer | B62B 1/262 135/117 |
| 6,648,349 B1 * | 11/2003 | Waller | B62B 3/004 280/47.35 |
| 6,701,948 B2 | 3/2004 | Jopp | |
| 6,805,269 B2 * | 10/2004 | Lockard | A61G 1/0225 280/30 |
| 7,143,601 B1 * | 12/2006 | Jimenez | F25D 23/12 220/592.03 |
| 7,654,277 B1 * | 2/2010 | Brewer | E04H 15/36 248/533 |
| D625,025 S * | 10/2010 | Colmore-Williams | D21/837 |
| 8,776,816 B2 | 7/2014 | Danziger | |
| 9,101,206 B1 * | 8/2015 | Chen | B62B 5/0013 |
| 10,066,417 B1 * | 9/2018 | Linyard | E04H 1/1205 |
| 10,625,762 B2 * | 4/2020 | Chapus | B62B 1/20 |
| 10,655,357 B1 * | 5/2020 | Graham | E04H 15/30 |
| 11,035,145 B2 * | 6/2021 | Smith | E04H 15/16 |
| 2001/0054433 A1 | 12/2001 | Patarra | A45C 11/20 62/331 |
| 2003/0047203 A1 * | 3/2003 | Lah | E04H 15/48 135/65 |
| 2003/0067131 A1 * | 4/2003 | Morgan | B62B 3/12 280/79.2 |
| 2004/0000774 A1 * | 1/2004 | Zeuner | A47F 5/108 280/651 |
| 2005/0284510 A1 * | 12/2005 | Rau | A45F 4/04 135/96 |
| 2010/0108451 A1 * | 5/2010 | Pain | A47C 17/82 190/115 |
| 2011/0056788 A1 * | 3/2011 | Jackson | A45C 9/00 190/115 |
| 2011/0101649 A1 * | 5/2011 | Harding | B62B 5/0013 280/47.35 |
| 2013/0015639 A1 * | 1/2013 | Bengtzen | A45C 9/00 280/651 |
| 2013/0207358 A1 * | 8/2013 | Appleby | B62B 1/26 280/30 |
| 2014/0077467 A1 * | 3/2014 | Galante | B62B 5/00 280/35 |
| 2021/0002919 A1 * | 1/2021 | Camillo | B62B 5/0013 |
| 2021/0085075 A1 * | 3/2021 | Volin | A47B 37/04 |
| 2022/0315080 A1 * | 10/2022 | Somheil | B62B 5/0033 |
| 2022/0388439 A1 * | 12/2022 | DeCristo | A47J 37/12 |
| 2023/0172331 A1 * | 6/2023 | Giannotti | A45C 9/00 190/11 |

* cited by examiner

PORTABLE SUN CANOPY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of buildings including canopies and tents, more specifically, a portable and collapsible sun canopy. (E04H15/44)

Summary of Invention

The portable sun canopy is a temporary structure. The portable sun canopy forms a protected space. The portable sun canopy is a collapsible structure. The portable sun canopy is a portable structure. The portable sun canopy forms a protected space when the portable sun canopy is deployed. The portable sun canopy is anchored into the ground. The portable sun canopy comprises a pedestal structure, a tarpaulin, and a storage cart. The pedestal structure elevates the tarpaulin above the ground. The tarpaulin forms a barrier that creates the protected space. The storage cart stores the portable sun canopy for transport after the portable sun canopy is collapsed.

These together with additional objects, features and advantages of the portable sun canopy will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable sun canopy in detail, it is to be understood that the portable sun canopy is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable sun canopy. 17

It is therefore important that the claims be regarded as including such equivalent construction insofar as they do not depart from the spirit and scope of the portable sun canopy. It is also to be understood that the phraseology and terminology 21 employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. 12

Figure 1:
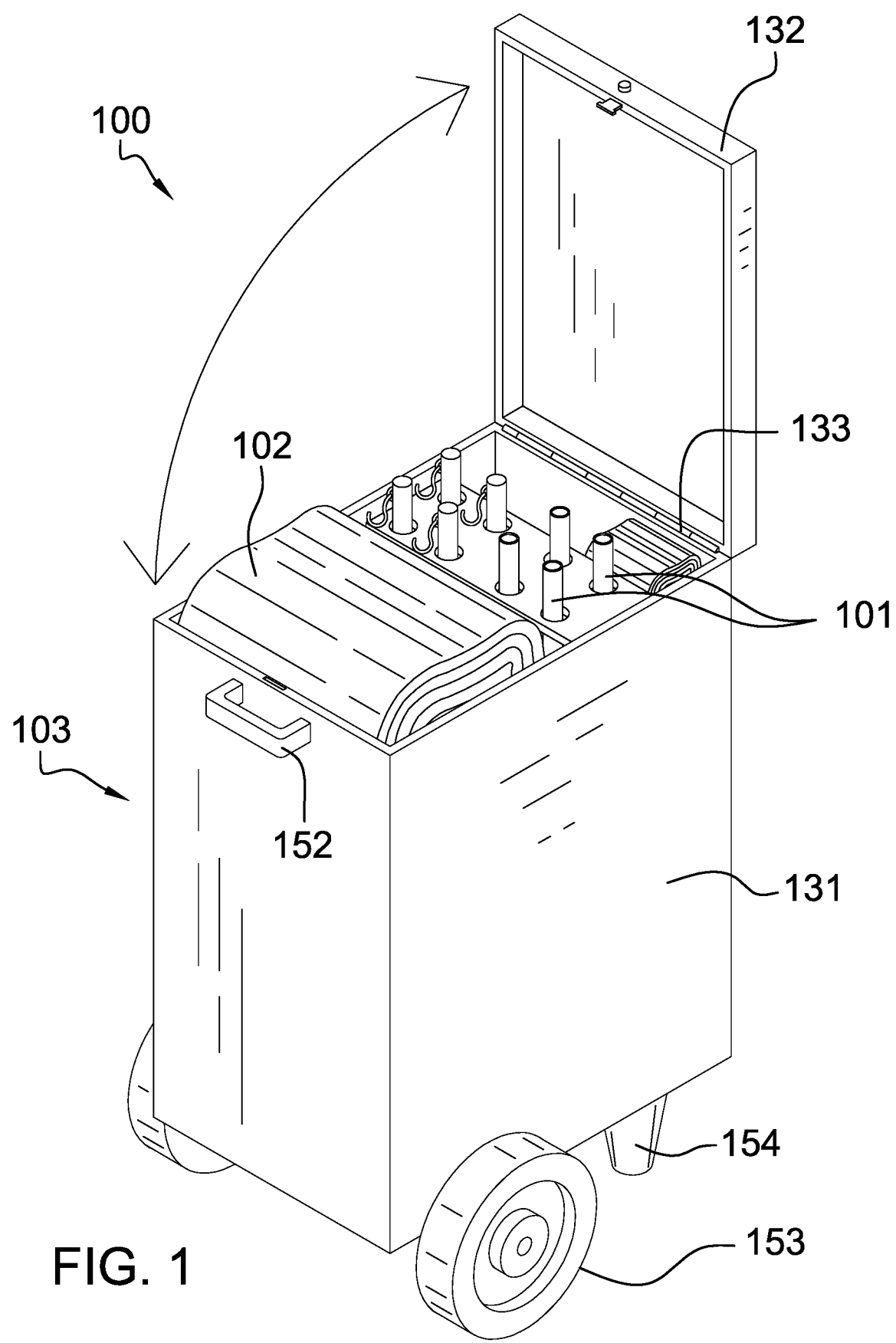
FIG. 1 is a perspective storage view of an embodiment of the disclosure.
Figure 2:
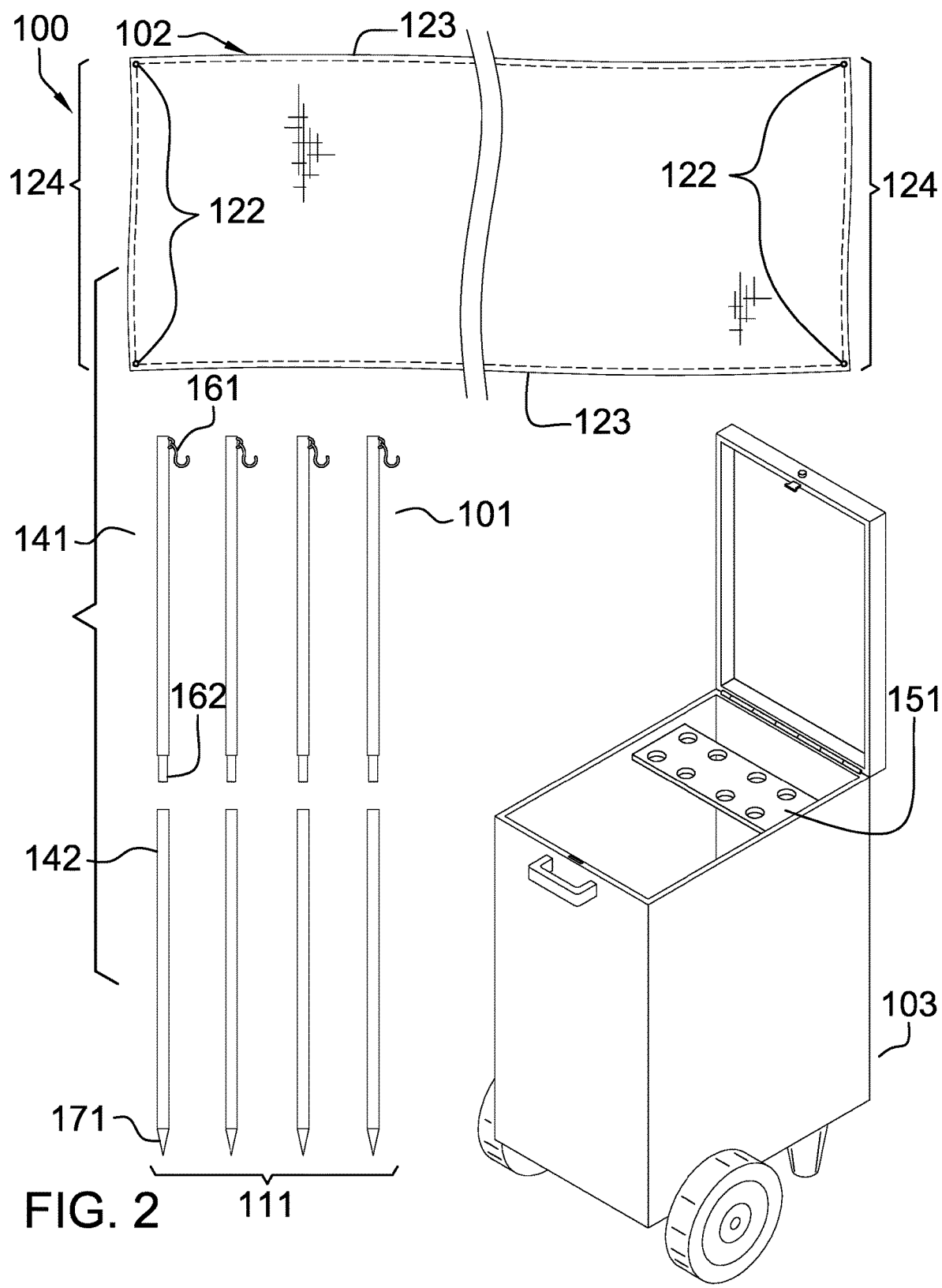
FIG. 2 is a front view of an embodiment of the disclosure.
Figure 3:
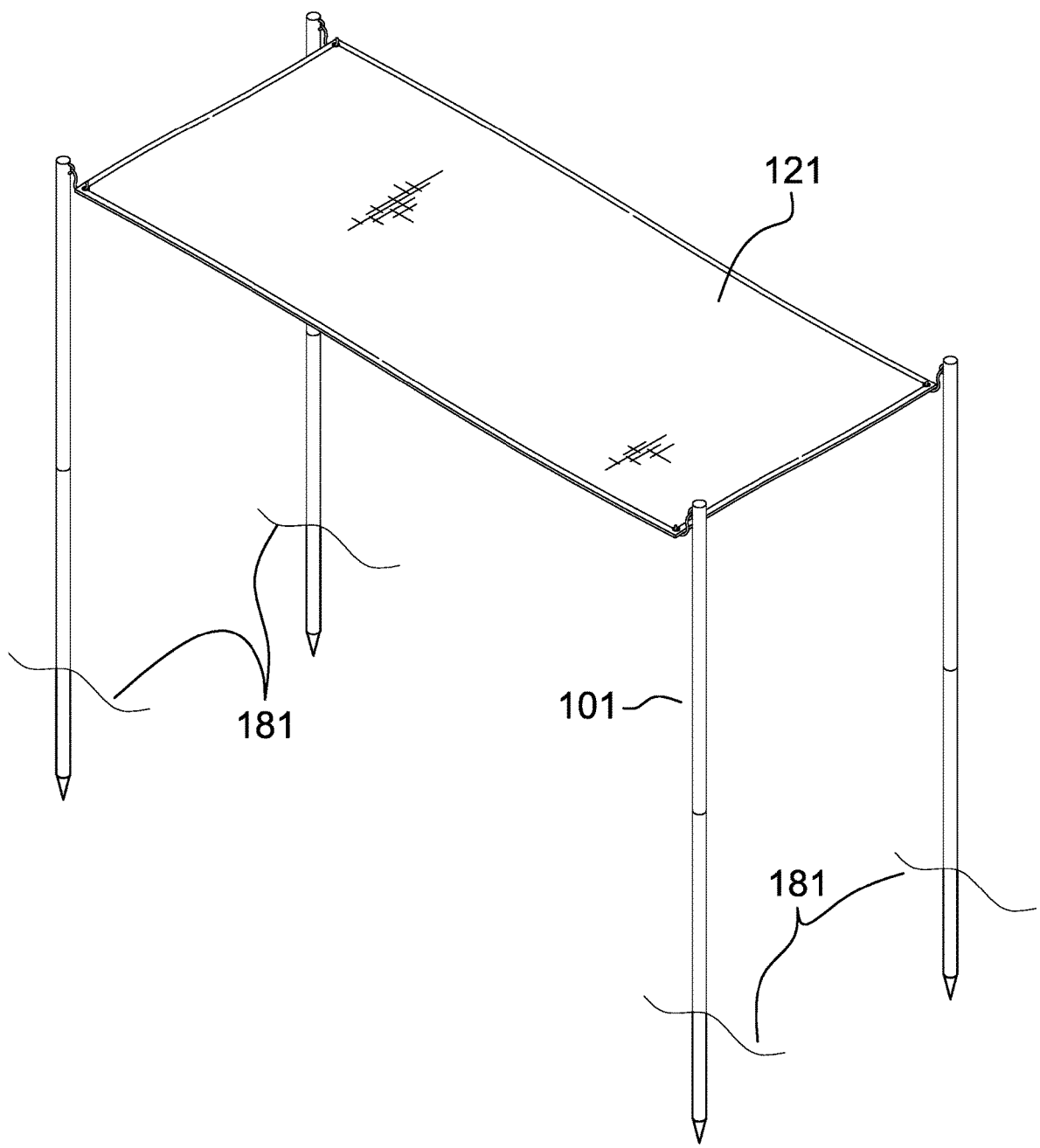
FIG. 3 is a perspective deployed view of an embodiment of the disclosure.
Figure 4:
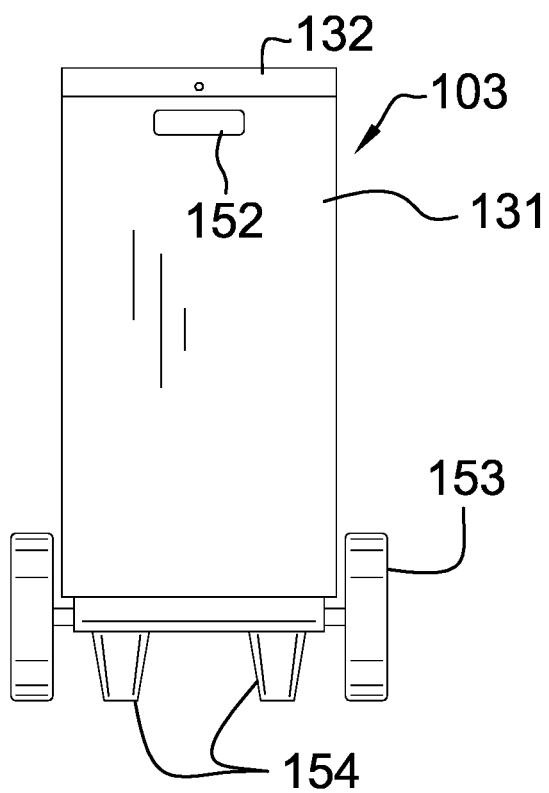
FIG. 4 is a detail view of an embodiment of the disclosure.
Figure 5:
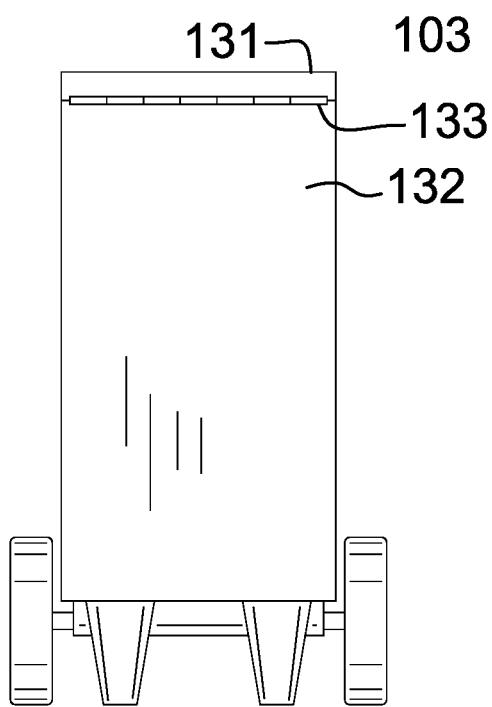
FIG. 5 is a detail view of an embodiment of the disclosure.
Figure 6:
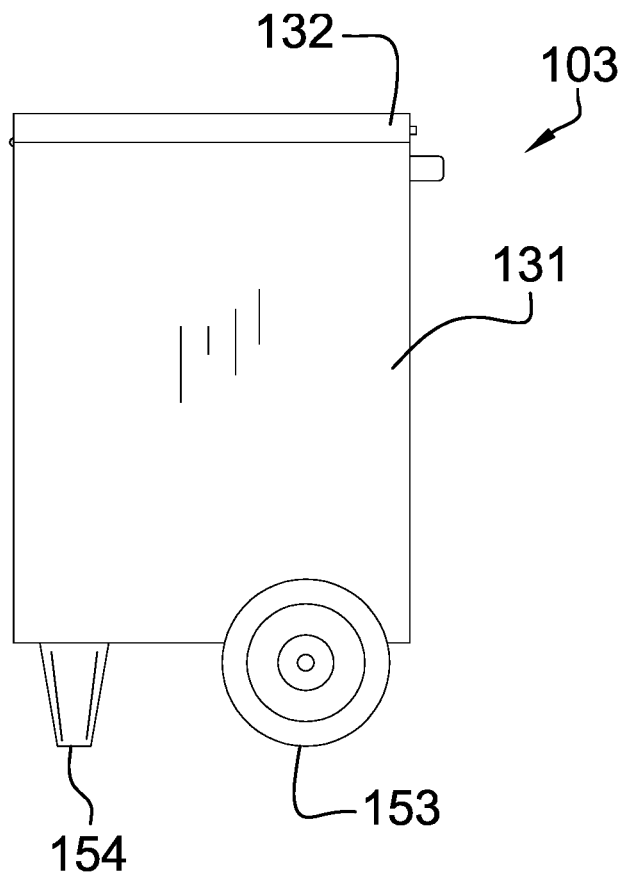
FIG. 6 is a detail view of an embodiment of the disclosure.

Detailed reference will now be made to one or more potential embodiments of the disclosure, which are illustrated in FIGS. 1 through 6.

The portable sun canopy 100 (hereinafter invention) is a temporary structure. The invention 100 forms a protected space. The invention 100 is a collapsible structure. The invention 100 is a portable structure. The invention 100 forms a protected space when the invention 100 is deployed. The invention 100 is anchored into the ground 181. The invention 100 comprises a pedestal structure 101, a tarpaulin 102, and a storage cart 103. The pedestal structure 101 elevates the tarpaulin 102 above the ground 181. The tarpaulin 102 forms a barrier that creates the protected space. The storage cart 103 stores the invention 100 for transport after the invention 100 is collapsed. The ground 181 is defined elsewhere in this disclosure.

The tarpaulin 102 is a sheeting structure. The tarpaulin 102 attaches to the pedestal structure 101. The tarpaulin 102 forms a canopy. The tarpaulin 102 forms the barrier that creates the protected space formed by the invention 100. The tarpaulin 102 comprises a superior sheeting 121 and a plurality of grommets 122.

The superior sheeting 121 is a sheeting. The superior sheeting 121 forms a fluid impermeable surface. The superior sheeting 121 forms the barrier that creates the protected space formed by the invention 100. The superior sheeting 121 forms 13 the superior structure of the invention 100. The superior 14 sheeting 121 further comprises a perimeter 123 and a plurality of vertices 124. The perimeter 123 forms the edges of the faces of the sheeting structure of the superior sheeting 121. The perimeter 123 forms the outer boundaries of the superior sheeting 121. The superior sheeting 121 has mounted in it a sub-plurality of grommets 122 selected from the plurality of grommets 122 that are distributed along the perimeter 123. Each of the plurality of vertices 124 is a vertex formed in the perimeter 123 of the superior sheeting 121. A grommet selected from the plurality of grommets 122 is positioned at a location proximal to each vertex selected from the plurality of vertices 124.

Each of the plurality of grommets 122 is a grommet. Each of the plurality of grommets 122 forms an anchor point used to attach the pedestal structure 101 to the superior sheeting 121. Each of the plurality of grommets 122 attaches to the superior sheeting 121 at a location proximal to a structure selected from the group consisting of: a) a vertex selected from the perimeter 123; and, b) an edge of the plurality of vertices 124 of the superior sheeting 121.

The pedestal structure 101 is a mechanical structure. The pedestal structure 101 elevates the tarpaulin 102 above the 12 ground 181. The pedestal structure 101 anchors into the ground 181. The pedestal structure 101 forms the load path that transfers the load of the tarpaulin 102 to the ground 181. The pedestal structure 101 comprises a plurality of individual stanchions 111.

Each individual stanchion 111 is a stanchion. Each individual stanchion 111 is identical. The tarpaulin 102 attaches to the individual stanchion 111. Each individual stanchion 111 elevates the tarpaulin 102 above the ground 181. Each individual stanchion 111 forms a portion of the load path that transfers the load of the tarpaulin 102 to the ground 181. Each individual stanchion 111 anchors into the ground 181. Each individual stanchion 111 comprises a superior stanchion 141 and an inferior stanchion 142.

The superior stanchion 141 is a composite prism-shaped structure. The superior stanchion 141 is a rigid structure. The superior stanchion 141 is a hollow structure. The superior stanchion 141 attaches directly to a grommet selected from the plurality of grommets 122 of the superior sheeting 121. The superior stanchion 141 attaches to the inferior stanchion 142 using a tent pole configuration. The tent pole configuration is defined elsewhere in this disclosure. The superior stanchion 141 forms a load path that transfers a portion of the load of the superior sheeting 121 to the inferior stanchion 142. The 12 superior stanchion 141 further comprises a hook 161 and a 13 ferrule 162.

The hook 161 is a fastening structure. The hook 161 is defined elsewhere in this disclosure. The hook 161 attaches to a location proximal to a congruent end of the hook 161. The hook 161 secures the superior stanchion 141 to a grommet selected from the plurality of grommets 122 mounted in the superior sheeting 121 of the tarpaulin 102.

The ferrule 162 is a prism-shaped structure. The ferrule 162 attaches to the congruent end of the prism-structure of the superior stanchion 141 that is distal from the hook 161. The ferrule 162 attaches to the congruent end of the prism-structure of the superior stanchion 141 to form a composite prism structure. The ferrule 162 is geometrically similar to the inferior stanchion 142. The superior stanchion 141 attaches to a congruent end of the prism structure of the inferior stanchion by inserting the ferrule 162 into the hollow interior of the inferior stanchion 142 to form the tent pole configuration. The inferior stanchion 142 is a composite prism-shaped structure. The inferior stanchion 142 is a rigid structure.

The inferior stanchion 142 is a hollow structure. The inferior stanchion 142 has a spit structure. The inferior stanchion 142 attaches to the end of the superior stanchion 141 that is distal from the superior sheeting 121. The superior stanchion 141 attaches to the inferior stanchion 142 using a tent pole configuration. The tent pole configuration is defined elsewhere in this disclosure. The inferior stanchion 142 anchors into the ground 181. The inferior stanchion 142 forms a load path that transfers a portion of the load of the superior stanchion 141 to the ground 181. The inferior stanchion 142 further comprises an apex structure 171.

The apex structure 171 is a point of a pyramid structure that attaches to the congruent end of the inferior stanchion 142 that is distal from the superior stanchion 141. The apex structure 171 is a sharpened structure. The apex structure 171 is driven into the ground 181 to anchor the individual stanchion 111 to the ground 181.

The storage cart 103 is a vehicle. The storage cart 103 is a hand cart. The storage cart 103 contains the pedestal structure 101 and the tarpaulin 102 when the invention 100 is collapsed. The storage cart 103 is a portable structure. The storage cart 103 rolls over the ground 181 to transport the invention 100. The storage cart 103 comprises a storage pan 131, a lid pan 132, and a hinge 133.

The storage pan 131 is a prism-shaped structure. The storage pan 131 has a pan shape. The storage pan 131 forms a protected space that stores the pedestal structure 101 and the tarpaulin 102 when the invention 100 is not in use. The open face of the pan structure of the storage pan 131 forms the superior surface of the prism structure of the storage pan 131. The closed face of the storage pan 131 forms the inferior surface of the prism structure of the storage pan 131. The storage pan 131 further comprises a stanchion rack 151, a handle 152, a plurality of wheels 153, and a plurality of cart 19 stanchions 154.

The stanchion rack 151 is a rack. The stanchion rack 151 mounts in the hollow interior of the storage pan 131. The stanchion rack 151 receives the superior stanchion 141 of each individual stanchion 111 selected from the pedestal structure 101 for storage. The stanchion rack 151 receives the inferior stanchion 142 of each individual stanchion 111 selected from the pedestal structure 101 for storage. The stanchion rack 151 isolates each superior stanchion 141 stored in the storage pan 131. The stanchion rack 151 isolates each inferior stanchion 142 stored in the storage pan 131. By isolate is meant that the stanchion rack 151 prevents any first superior stanchion 141 from coming in contact with any second superior stanchion 141. By isolate is further meant that the stanchion rack 151 prevents any first inferior stanchion 142 from coming in contact with any second inferior stanchion 142. By isolate is further meant that the stanchion rack 151 prevents any superior stanchion 141 from coming in contact with any inferior stanchion 142.

The handle 152 is a grip that mounts on an exterior lateral face of the prism structure of the storage pan 131. The handle 152 is used to manipulate and transport the storage cart 103.

Each of the plurality of wheels 153 is a rotating structure. Each of the plurality of wheels 153 is selected from the group consisting of a wheel and a caster. Each of the plurality of wheels 153 mounts on the inferior surface of the pan structure of the storage pan 131. The plurality of wheels 153 allow the storage cart 103 to roll over the ground 181.

Each of the plurality of cart stanchions 154 is a mechanical structure. Each of the plurality of cart stanchions 154 mounts on the inferior surface of the pan structure of the storage pan 131. Each of the plurality of cart stanchions 154 elevates the inferior surface of the storage pan 131 above the ground 181 when the storage cart 103 is in a stationary position.

The lid pan 132 is a prism-shaped structure. The lid pan 132 has a pan shape. The lid pan 132 is geometrically similar to the open face of the pan structure of the storage pan 131.

The size of the form factor of the lid pan 132 is greater than the size of the form factor of the open face of the storage pan 131 such that the lid pan 132 encloses the storage pan 131. The lid pan 132 controls access to the interior storage space formed by the storage pan 131. The lid pan 132 locks to the storage pan 131 when the storage cart 103 is in the closed position.

The hinge 133 is a fastening structure. The hinge 133 is a rotating structure. The hinge 133 secures the lid pan 132 to the storage pan 131 such that the lid pan 132 rotates relative to the storage pan 131. The hinge 133 rotates the lid pan 132 between an open position and a closed position. 19

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Apex: As used in this disclosure, an apex is a vertex that forms an extreme or solitary point of an object.

At a Location Proximal to: As used in this disclosure, the term "at a location proximal to" identifies the position of an object selected from a group relative to an identified location such that the span of distance from the identified location and the selected object is less than the span of distance between the identified location and any object remaining in the group. Stated less formally, at a location proximal to means that the selected object is closer to the identified location than any other object selected from the group.

Barrier: As used in this disclosure, a barrier is a physical obstacle that forms a boundary between a first space and a second space. The barrier prevents the passage of an object between the first space and the second space.

Brink: As used in this disclosure, a brink refers to the edge or line formed by the intersection of a first plane or surface and a second plane or surface wherein a cant exists between the first plane or surface and the second plane or surface.

Building: As used in this disclosure, a building is a structure located in a fixed position that forms one or more protected spaces.

Canopy: As used in this disclosure, a canopy is a cover, usually made of fabric that is placed above an area and creates a protected space within which people or objects are protected from the environment.

Cant: As used in this disclosure, a cant is an angular deviation from one or more reference lines (or planes) such as a vertical line (or plane) or a horizontal line (or plane).

Cart: As used in this disclosure, a cart is small vehicle intended to be moved by a person. A synonym for cart is hand cart.

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Closed Position: As used in this disclosure, a closed position refers to a rotating structure that is in an orientation that prevents access to the contents of the structure. The closed position is often referred to as an object being "closed."

Collapsible: As used in this disclosure, the terms collapsible refers to an object that is configured such that the volume of the object is adjustable. By volume is meant the volume of the perimetrical boundary that contains the object. The verbs collapse and retract mean that the volume of the perimetrical boundary of the object changes from a larger volume to a smaller volume. The verbs expand and deploy mean that the volume of the perimetrical boundary of the object changes from a smaller volume to a larger volume.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Eyelet: As used in this disclosure, an eyelet is a ring shaped mechanical structure intended to reinforce and protect the edges of an aperture.

Ferrule: As used in this disclosure, a ferrule is a cylindrical device that is used to interconnect pipes in a tent pole configuration.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Grommet: As used in this disclosure, a grommet is an eyelet placed in a hole in a textile, sheet, or panel that protects a rope hook or cable passed through it and to protect the textile, sheet, or panel from being torn.

Ground: As used in this disclosure, the ground is a solid supporting surface formed by the Earth. The term level ground means that the supporting surface formed by the ground is roughly perpendicular to the force of gravity.

Handle: As used in this disclosure, a handle is an object by which a tool, object, or door is held or manipulated with the hand.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Lid: As used in this disclosure, a lid is a removable cover that is placed over an opening of a hollow structure to enclose the hollow structure.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

N-gon: As used in this disclosure, an N-gon is a regular polygon with N sides wherein N is a positive integer number greater than 2.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a rotating structure that is in an orientation that allows access to the contents of the structure. The open position is often referred to as an object being "open."

Orientation: As used in this disclosure, orientation refers to the positioning of a first object relative to: 1) a second object; or, 2) a fixed position, location, or direction Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Permanent: As used in this disclosure, the term permanent refers to a fundamental state, condition or location of an object, process, or arrangement that is not subject to, or expected to be, changed. A perpetual object refers to a permanent object that is expected to last over an unlimited period of time. A building such as a house or a skyscraper would be considered permanent. An ocean would be considered perpetual.

Pivot: As used in this disclosure, a pivot is a rod or shaft around which an object rotates or swings.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Portable: As used in this disclosure, the term portable refers to an object with a form factor and weight that allows an individual to physically carry or manually transport the object to its intended destination.

Protected Space: As used in this disclosure, a protected space is a negative space within which an object is stored. The protected space is enclosed by a barrier structure that: a) prevents damage to the object contained within the protected space;, b) maintains an environment suitable within the protected space that is appropriate for the object; or, c) protects the object within the protected space from potential dangers that are outside of the protected space.

Pyramid: As used in this disclosure, a pyramid is a three-dimensional shape that comprises a base formed in the shape of an N-gon (wherein N is an integer) with N triangular faces that rise from the base to converge at a point above the base. The center axis of a pyramid is the line drawn from the vertex where 7 the N faces meet to the center of the N-gon base. The center axis of a right pyramid is perpendicular to the N-gon base. Pyramids can be further formed with circular or elliptical bases which are commonly referred to as a cone or an elliptical pyramid respectively. A pyramid is defined with a base, an apex, and a lateral face. The base is the N-gon shaped base described above. The apex is the vertex that defines the center axis. The lateral face is formed from the N triangular faces described above.

Rack: As used in this disclosure, a rack is a structure that holds or supports and object in a visible or exposed manner.

Rigid Structure: As used in this disclosure, a rigid structure is a solid structure formed from an inelastic material that resists changes in shape. A rigid structure will permanently deform as it fails under a force. See bimodal flexible structure.

Sharp: As used in this disclosure, the term sharp refers to an apex or a brink that is formed in a first structure that is capable of puncturing or cutting a second structure.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Spit: As used in this disclosure, a spit refers to a composite prism structure formed by the combination of a prism and a pyramid such that the apex of the pyramid forms a point capable of pushing through the surface of a second structure.

Stake: As used in this disclosure, a stake is a spit that is driven into a horizontal surface, such as the ground, to serve as an anchor point.

Stanchion: As used in this disclosure, a stanchion refers to a vertically oriented prism-shaped pole, post, or support.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a fastening structure that attaches a first object to a second object such that will rotate around an axis of rotation while the second object remains in a fixed position relative to the first object.

Tarpaulin: As used in this disclosure, a tarpaulin is a protective covering made of a sheeting. The sheeting can be a textile material made from made from fibers or yarns suitable for textile production methods including, but not limited to, weaving, knitting or felting. The sheeting can also be made of material in the form of a continuous film including, but not limited to, plastic films and metal foils.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Temporary: As used in this disclosure, the term temporary refers to a state, condition or location of an object, process, or arrangement that is intended to last for a limited period of time. The term temporary is the opposite of permanent. The term transient refers to a temporary state or condition of an object that degrades over time. In physical processes, the term transient tends to imply a short period of time.

Tent Pole Configuration: As used in this disclosure, a tent pole configuration is a method of interconnecting a plurality of pipes (or other hollow prism shaped objects). With the exception of the span of the length of the center axis of the pipe, each pipe contained in the plurality of pipes is otherwise identical to the pipes remaining in the plurality of pipes. In a tent pole configuration, each of the plurality of pipes is fitted with a ferrule. The ferrule is a cylindrical object that is attached to an end of each pipe such that the center axis of the ferrule is aligned with the center axis of the pipe. The outer diameter of the ferrule is less than the inner diameter of the pipe. To interconnect the plurality of pipes into a tent pole configuration, the ferrule of a first pipe selected from the plurality of pipes is inserted into the non-ferrule end of a second pipe selected from the plurality of pipes. This process is continued until all the pipes contained within the plurality of pipes are interconnected.

Textile: As used in this disclosure, a textile is a material that is woven, knitted, braided or felted. Synonyms in common usage for this definition include fabric and cloth. The two surfaces of the textile with the greatest surface area are called the faces of the textile.

Vertex: As used in this disclosure, a vertex (plural vertices) is an angle that is formed by two lines (or a plurality of surfaces) that form a point. Vertices are commonly found in polygons, prisms and pyramids.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A portable sun canopy comprising:
a pedestal structure, a tarpaulin, and a storage cart;
wherein the pedestal structure elevates the tarpaulin above the ground in a deployed position;
wherein the tarpaulin forms a barrier;
wherein the storage cart stores the pedestal structure and tarpaulin for transport when collapsed;
wherein the tarpaulin comprises a sheeting and a plurality of grommets;
wherein each of the plurality of grommets forms an anchor point used to attach the pedestal structure to the sheeting;
wherein the sheeting further comprises a perimeter and a plurality of vertices;
wherein the sheeting has mounted in it a sub-plurality of grommets selected from the plurality of grommets that are distributed along the perimeter;
wherein each of the plurality of vertices is formed in the perimeter of the sheeting;
wherein a grommet selected from the plurality of grommets is positioned at a location proximal to a selected vertices of the plurality of vertices;
wherein the storage cart comprises a storage pan, a lid pan, and a hinge;
wherein the lid pan controls access to the interior storage space formed by the storage pan; and
wherein the lid pan locks to the storage pan when the storage cart is in the closed position.

2. The portable sun canopy according to claim 1,
wherein the portable sun canopy is a temporary structure;
wherein the portable sun canopy is a collapsible structure;
wherein the portable sun canopy is a portable structure;
wherein the portable sun canopy is anchored into the ground in a deployed position; and
wherein the tarpaulin forms a barrier creating a protected space when deployed.

3. The portable sun canopy according to claim 2,
wherein the tarpaulin attaches to the pedestal structure; and
wherein the tarpaulin forms a canopy.

4. The portable sun canopy according to claim 3,
wherein the pedestal structure is a mechanical structure;
wherein the pedestal structure elevates the tarpaulin above the ground when deployed;
wherein the pedestal structure anchors into the ground wherein the pedestal structure elevates the tarpaulin above the ground when deployed;
wherein the pedestal structure forms the load path that transfers the load of the tarpaulin to the ground wherein the pedestal structure elevates the tarpaulin above the ground when deployed.

5. The portable sun canopy according to claim 4,
wherein the storage cart is a vehicle;
wherein the storage cart is a hand cart;

wherein the storage cart contains the pedestal structure and the tarpaulin when is collapsed;

wherein the storage cart is a portable structure;

wherein the storage cart can roll over the ground to transport the portable sun canopy.

6. The portable sun canopy according to claim 5, wherein the pedestal structure comprises a plurality of individual stanchions;

wherein each individual stanchion is identical;

wherein the tarpaulin attaches to each individual stanchion of the plurality of individual stanchions;

wherein each individual stanchion elevates the tarpaulin above the ground when deployed;

wherein each individual stanchion forms a portion of the load path that transfers the load of the tarpaulin to the ground; and wherein each individual stanchion anchors into the ground when deployed.

7. The portable sun canopy according to claim 6, wherein each individual stanchion comprises a superior stanchion and an inferior stanchion;

wherein each superior stanchion attaches directly to a grommet selected from the plurality of grommets of the sheeting; and wherein each inferior stanchion attaches to the end of a superior stanchion that is distal from the sheeting.

8. The portable sun canopy according to claim 7, wherein the hinge is a fastening structure;

wherein the hinge is a rotating structure;

wherein the hinge secures the lid pan to the storage pan such that the lid pan rotates relative to the storage pan; and wherein the hinge rotates the lid pan between an open position and a closed position.

9. The portable sun canopy according to claim 8, wherein the storage pan has a pan shape; and wherein the storage pan forms a protected space that stores the pedestal structure and the tarpaulin when not in use.

10. The portable sun canopy according to claim 9, wherein the lid pan has a pan shape;

wherein the lid pan is geometrically similar to the storage pan; and wherein the size of the lid pan is greater than the of the storage pan such that the lid pan encloses the storage pan.

11. The portable sun canopy according to claim 10, wherein the sheeting forms a fluid impermeable surface; and wherein the sheeting forms the barrier that creates the protected space.

12. The portable sun canopy according to claim 11, wherein each of the plurality of grommets attaches to the-sheeting at a location proximal to a structure selected from the group consisting of: a) a vertices selected from the perimeter; and, b) an edge of the plurality of vertices of the sheeting.

13. The portable sun canopy according to claim 12, wherein superior stanchion is a hollow rigid composite structure;

wherein each superior stanchion attaches to an inferior stanchion using a tent pole configuration; and wherein each superior stanchion forms a load path that transfers a portion of the load of the sheeting to the inferior stanchion to which it attaches.

14. The portable sun canopy according to claim 13, wherein each inferior stanchion is a hollow rigid composite structure;

wherein each inferior stanchion has a spit structure;

wherein each inferior stanchion anchors into the ground when deployed; and forms a load path that transfers a portion of the load of the superior stanchion of which it is attached to the ground.

15. The portable sun canopy according to claim 14, wherein each superior stanchion further comprises a hook and a ferrule;

wherein the hook is a fastening structure;

wherein the hook secures the superior stanchion to a grommet selected from the plurality of grommets mounted in the sheeting of the tarpaulin;

wherein the ferrule attaches to the congruent end of the superior stanchion that is distal from the hook;

wherein the ferrule attaches to the congruent end of the superior stanchion to form a composite structure;

wherein the ferrule is geometrically similar to a respective inferior stanchion; and wherein the superior stanchion attaches to a congruent end of the respective inferior stanchion by inserting the ferrule into the hollow interior of the inferior stanchion to form the tent pole configuration.

16. The portable sun canopy according to claim 15, wherein each inferior stanchion further comprises an apex structure;

wherein the apex structure is a point of a pyramid structure that attaches to the congruent end of the respective inferior stanchion that is distal from the respective superior stanchion;

wherein the apex structure is a sharpened structure; and wherein the apex structure is driven into the ground to anchor the individual stanchion to the ground when deployed.

\* \* \* \* \*